No. 763,267. Patented June 21, 1904.

UNITED STATES PATENT OFFICE.

JOHN T. DAVIS, OF SAN FRANCISCO, CALIFORNIA.

MANUFACTURE OF ARTIFICIAL FUEL BY DISTILLATION.

SPECIFICATION forming part of Letters Patent No. 763,267, dated June 21, 1904.

Application filed July 1, 1901. Renewed November 28, 1903. Serial No. 183,071. (No specimens.)

*To all whom it may concern:*

Be it known that I, JOHN T. DAVIS, a citizen of the United States, residing at San Francisco, in the county of San Francisco and State of California, have invented certain new and useful Improvements in the Manufacture of Artificial Fuel by Distillation, of which the following is a specification.

My invention relates to the manufacture of artificial fuel, and is a new process by which such a fuel, or a binding composition which is adapted to subsequently form part of such a fuel, can be rapidly and cheaply made and which results in a better product than can be produced by methods now in use. Such product also forms a part of the invention.

The essential idea or principle of my process is to mix together a hydrocarbon and carbonaceous material and to subject the mixture to heat, whereby lighter hydrocarbons are distilled off, and thus to leave a combustible residuum composed of heavier hydrocarbons and the carbonaceous or carboniferous material in intimate union. Such residuum according to proportions is adapted for use either as the fuel itself or as a binding composition to form a part of a subsequently-prepared fuel.

The process has advantages of a double nature, part of them relating to the operation of distillation and part to the manufacture of the special product. There is but one series of operations; but that operation takes the place of several operations now required to produce a result of an inferior character.

Present practice requires a still in which the lighter hydrocarbons are distilled off until a residuum suitable for use in a fuel is left. Then by another process and in other apparatus this residuum must be treated by heat to render it capable of uniting with the carboniferous material. Finally the union or mixture must be mechanically made by agitation, stirring, &c., in the presence of heat. By my new process and at one operation all these results are performed and better performed—that is to say, the separation of the lighter hydrocarbons and a better and more intimate mixture of the heavy hydrocarbons with the carbonaceous or carboniferous material are going on simultaneously until at the end of the process the said separation is complete and the said mixture is also complete. So much for economy in time, expense, apparatus, and labor. Further, there are great advantages in the mode of distilling in recovering the distillates, since the carbonaceous or carboniferous material tends to absorb the heavy hydrocarbons and hold them, thus allowing more rapid distillation. The mass is so subdivided that in its atomized condition vaporization of the lighter hydrocarbons takes place more speedily. Further, in relation to the production of a fuel the tendency to absorption referred to more thoroughly incorporates the heavy hydrocarbons with the carbonaceous or carboniferous material, and this is of great importance, since the fuel produced is harder and firmer.

In carrying out my process I do not limit myself to any particular kind or design of apparatus, as many different forms can be used; nor have I considered it necessary for the purpose of this application to illustrate any apparatus at all, since any apparatus alluded to herein is of a character so simple as to be readily comprehended by all skilled in the art.

In commencing my process I mix together a hydrocarbon—for instance, crude petroleum—and carbonaceous or carboniferous material, preferably in a finely-divided condition. In making this mixture the proportions depend upon the character and quality of the carbonaceous or carboniferous material, the gravity of the oil, the amount of heavy hydrocarbon in the oil suitable for forming a part of the fuel, and, finally, upon whether the resulting product is to be the fuel itself or a binding composition to subsequently form part of a fuel. As an illustrative proportion, however, to produce a fuel it can be stated that crude petroleum of 16° Baumé having an asphaltic base will give about thirty per cent. of the hydrocarbon suitable to make a first-class fuel. Of oil of this kind there would be required in proportion to each ton of fine coal, assuming that as suitable carboniferous material, from three hundred to one thousand pounds crude, according to the combustible value of the carboniferous material. To produce a binder from the same materials, the proportion of crude oil must evidently be increased on account of the subsequent addition of other and probably inferior material to complete the fuel and which must be firmly bound into a homogeneous mass by the binder which is produced by this process. The mixture is now exposed to heat, preferably by being carried through a heated passage or oven in any suitable way, as by an ordinary screw conveyer, which keeps it in motion. The heat must be sufficient to distill off the lighter series of hydrocarbons, which escape and are condensed, and the heat is regulated so as to cause the distillation to proceed to the point where a hydrocarbon of the desired hardness for fuel purposes remains mixed with the other material. This can be ascertained by taking and examining samples from the mass from time to time. When distillation has reached a satisfactory stage, the mass is cooled down in any suitable way, as by surrounding a part of the conveyer with water. It is desirable that the cooling operation should immediately succeed the distilling operation without intermediate exposure to air, since it insures the condensation of all heavy hydrocarbon vapors in the pores of the carbonaceous or carboniferous material, increasing its combustibility as well as preventing the loss of any of the material. This manner of mixing and heating associates and binds the elements much better than when the mixing is done in the open air, giving the product a stability in the fire which is not otherwise secured. When the mixture is made in the open air, the union is more superficial, while under the higher temperatures required for distillation the hydrocarbons thoroughly penetrate the carbonaceous or carboniferous material, and it becomes harder and firmer. After cooling the mass is removed or discharged and made into briquets or suitable shapes.

The carboniferous material may be fine coal or any other suitable material of a carbonaceous or carboniferous character, among which may be mentioned lignite, screenings, culm, dust, &c.

Having thus fully described my invention, what I claim as new, and desire to secure by Letters Patent, is—

1. The process of producing an artificial fuel product which consists in mixing together a hydrocarbon and carbonaceous material, and subjecting the same during mixture to heat, whereby partial distillation of the lighter hydrocarbons is effected.

2. The process of producing an artificial fuel product which consists in mixing together a hydrocarbon, and carbonaceous material in a finely-divided state, and subjecting the same during mixture to a progressive heat, whereby partial distillation of the lighter hydrocarbons is effected.

3. The process of producing an artificial fuel product which consists in mixing together petroleum and carbonaceous material, and subjecting the mixture to an increasing degree of heat, whereby partial and progressive distillation is effected.

4. The process of producing an artificial fuel product which consists in mixing together petroleum, and carbonaceous material in a finely-divided state, and subjecting the mixture to a continuously-increasing degree of heat, whereby partial and progressive distillation is effected.

5. The process of producing an artificial fuel product which consists in mixing together a hydrocarbon and fine carbonaceous material, subjecting the mixture to heat in a progressive degree, whereby distillation of the lighter hydrocarbons takes place successively leaving a combustible residuum, and then cooling said combustible residuum, before pressing.

6. The process of producing an artificial fuel product, which consists in mixing together crude petroleum and fine carbonaceous material, agitating the mixture while exposed to heat and moving the same into relatively hotter portions of the apparatus so as to expose the divided particles to the progressive heat, and effect the distillation of the lighter hydrocarbons in order and leave the heavier hydrocarbons associated with the corbonaceous material.

7. The composition of matter for artificial fuel composed of the residue obtained by the partial distillation of a mixture of hydrocarbon and a carbonaceous material.

8. The composition of matter for artificial fuel composed of the residue obtained by the partial progressive distillation of a mixture of hydrocarbon and carbonaceous material in a finely-divided state.

9. The composition of matter for artificial fuel composed of the residue obtained by the partial distillation of a mixture of petroleum and carbonaceous material under exclusion of air.

10. The composition of matter for artificial fuel composed of the residue obtained by the partial distillation of a mixture of petroleum and carbonaceous material in a finely-divided state.

In testimony whereof I have affixed my signature, in presence of two witnesses, this 24th day of May, 1901.

JOHN T. DAVIS.

Witnesses:
L. W. SEELEY,
F. M. BURT.